United States Patent
Bernacki

(10) Patent No.: US 11,236,865 B2
(45) Date of Patent: Feb. 1, 2022

(54) AUTOMATIC DETECTION OF MOISTURE IN COMPRESSED GAS CYLINDER

(71) Applicant: CryoVation, LLC, Hainesport, NJ (US)

(72) Inventor: Joseph K. Bernacki, Pemberton, NJ (US)

(73) Assignee: CRYOVATION, LLC., Hainesport, NJ (US)

( * ) Notice: Subject to any disclaimer, the term of this patent is extended or adjusted under 35 U.S.C. 154(b) by 246 days.

(21) Appl. No.: 16/260,316

(22) Filed: Jan. 29, 2019

(65) Prior Publication Data

US 2019/0234562 A1    Aug. 1, 2019

Related U.S. Application Data

(60) Provisional application No. 62/623,041, filed on Jan. 29, 2018.

(51) Int. Cl.
| | |
|---|---|
| *G01N 25/66* | (2006.01) |
| *F17C 13/02* | (2006.01) |
| *F17C 5/00* | (2006.01) |
| *F17C 13/00* | (2006.01) |

(52) U.S. Cl.
CPC .............. *F17C 13/02* (2013.01); *F17C 5/007* (2013.01); *F17C 13/00* (2013.01); *G01N 25/66* (2013.01); *F17C 2201/056* (2013.01); *F17C 2223/0123* (2013.01); *F17C 2250/046* (2013.01)

(58) Field of Classification Search
None
See application file for complete search history.

(56) References Cited

U.S. PATENT DOCUMENTS

| | | | | |
|---|---|---|---|---|
| 5,139,344 A | * | 8/1992 | Mutter | G01N 25/68 374/28 |
| 6,022,138 A | * | 2/2000 | Sonander | G01N 25/68 374/28 |
| 2010/0116021 A1 | * | 5/2010 | O'Brien | G01N 21/3518 73/23.37 |
| 2013/0058375 A1 | * | 3/2013 | Hernandez | G01N 25/70 374/24 |
| 2014/0026982 A1 | * | 1/2014 | Shurtleff | F02C 7/22 137/334 |

* cited by examiner

*Primary Examiner* — Lisa M Caputo
*Assistant Examiner* — Nigel H Plumb
(74) *Attorney, Agent, or Firm* — Schott, P.C.

(57) ABSTRACT

An automatic system and method to detect moisture in a compressed gas cylinder is faster, less labor intensive and has increased accuracy, including the ability to detect free moisture, over prior methods and devices. This device and method avoid the need to individually invert cylinders. A system to detect moisture level in a compressed gas cylinder includes a gas vent/fill line that is in fluid communication with a compressed gas cylinder; a vacuum system with a vacuum line and a vacuum pump connected to the vacuum line; and a dewpoint monitor connected to a dewpoint line and the vacuum line. When a compressed gas cylinder is connected to the gas vent/fill line, the vacuum pump draws gas from the gas vent/fill line into the vacuum line and the dewpoint line, and into the dewpoint monitor, where the dewpoint monitor measures moisture content in compressed gas.

10 Claims, 3 Drawing Sheets

AUTOMATIC DETECTION OF MOISTURE IN COMPRESSED GAS CYLINDER

BACKGROUND

Excess moisture, or water syrup that combines water with other substances, in a cylinder can cause contamination and corrosion of the cylinder. The FDA and other regulators require that cylinders be free of, or largely free of water, to avoid contamination of the fluid in the cylinder. In current practice, cylinders had to be individually inverted to detect moisture, which is labor intensive, time consuming, and often inaccurate.

SUMMARY OF THE EMBODIMENTS

This invention describes a new, automatic method to detect moisture in a compressed gas cylinder, which method is faster, less labor intensive and has increased accuracy, including the ability to detect free moisture, over prior methods and devices. This device and method avoid the need to individually invert cylinders.

A system to detect moisture level in a compressed gas cylinder includes a gas vent/fill line configured to be in fluid communication with a compressed gas cylinder; a vacuum system with a vacuum line and a vacuum pump connected to the vacuum line; and a dewpoint monitor connected to a dewpoint line and the vacuum line. When a compressed gas cylinder is connected to the gas vent/fill line, the vacuum pump draws gas from the gas vent/fill line into the vacuum line and the dewpoint line, and into the dewpoint monitor, where the dewpoint monitor measures moisture content in compressed gas.

DETAILED DESCRIPTION

Overview

The method and device use a measurement device (or devices) to determine the level of humidity present in an atmosphere, but adapts the device such that it can detect moisture in a compressed gas cylinder before filling. By way of non-limiting example, dewpoint monitors such as the StylAir LLC or the StylAir 0A14/20-6n2 Digital Dewpoint Monitor could be used.

The dewpoint measurement instrument is incorporated into an apparatus that is used to fill and/or vent a cylinder, thereby creating the ability to determine if water or a foreign substance if present in the cylinder prior to filling. Depending on the system, the monitor could be set up to read the moisture level of the cylinder automatically, and/or could be set up to trigger the filling of the cylinder upon the receipt of an appropriate moisture level reading. The method could also include a mechanism to stop the filling of cylinders upon the receipt of a high moisture reading. This apparatus may be used when a cylinder is being filled with food-grade gas, although it is not limited to only food-grade gas, whereby excess moisture causes contamination of the gas. It also provides means to measure dewpoint in an expedient time-period, as opposed to the previously used device and method, which required extended time to make these measurements. Furthermore, the dewpoint or moisture measurement can be taken without having to invert the individual cylinders, thereby better allowing an automated filling process and avoiding the need for a visual moisture inspection process, which is less accurate and time consuming.

Apparatus

Figure 1:
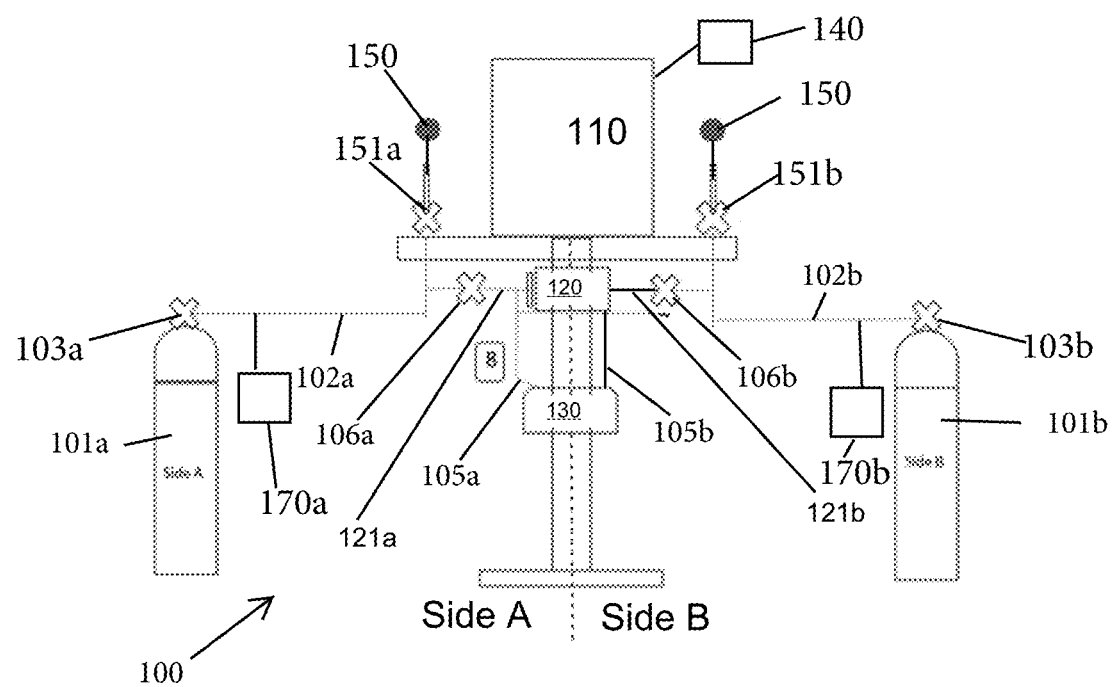
FIG. 1 shows a schematic view of the system described herein.

FIG. 1 shows an apparatus 100 used to detect moisture and fill cylinders. The apparatus 100 may include first and second sides, labeled Side A and Side B in the figures.

The system 100 as shown includes compressed gas cylinder(s) 101a, 101b in fluid communication with a vacuum pump 130 and a dewpoint monitor 120. When valves are open between the gas cylinder(s) 101a, 101b and the vacuum pump 130 and dewpoint monitor 120, the dewpoint monitor 120 can read a dewpoint associated with the gas cylinders 101a, 101b and this reading may be used to alert users that a cylinder is not ready for filling.

The gas cylinders 101a, 101b may engage the system 100 through a gas cylinder engagement valve 103a, 103b that can be turned off during engagement and disengagement of a gas cylinder 101a, 101b, or open during dewpoint testing and filling.

The gas cylinder engagement valves 103a, 103b are in fluid communication with a gas vent/fill line 102a, 102b that may be in communication with a vent 170 to vent the lines. The gas vent/fill line 102a, 102b is also in fluid communication with a gas source 150 via a gas source valve 151a, 151b. When the gas source valve 151a, 151b is open and a vacuum valve 106a, 106b is closed, the fluid from the source (CO2 or other) may flow into the gas cylinder 101a, 101b. Such filling would, using the system, usually take place after testing the cylinder(s) 101a, 101b to see if they were beneath a predetermined moisture content threshold.

Otherwise, during gas cylinder 101a, 101b moisture content testing, a vacuum system that includes a vacuum line 105a, 105b and a vacuum pump 130 connected to the vacuum line 105a, 105b may draw compressed gas from the gas cylinder 101a, 101b. This compressed gas passes through the vacuum line 105a, 105b and the dewpoint line 121a, 121b, and into the dewpoint monitor 120, where the dewpoint monitor 120 measures moisture content in compressed gas.

It should be appreciated that during filling when the vacuum valve 106a, 106b is closed, the vacuum pump cannot draw gas from the gas vent/fill line 102a, 102b.

The system may also include a control system 110 that controls the vacuum pump 130, all of the valves, a notification system 140, and/or the dewpoint monitor 120. The notification system 140 may be activated directly to send a message or alert through the control system 110 when dewpoint measurements from the dewpoint monitor 120 are at or exceed (or even if they are below a threshold moisture level in the cylinder 101a, 101b.

Figure 2:
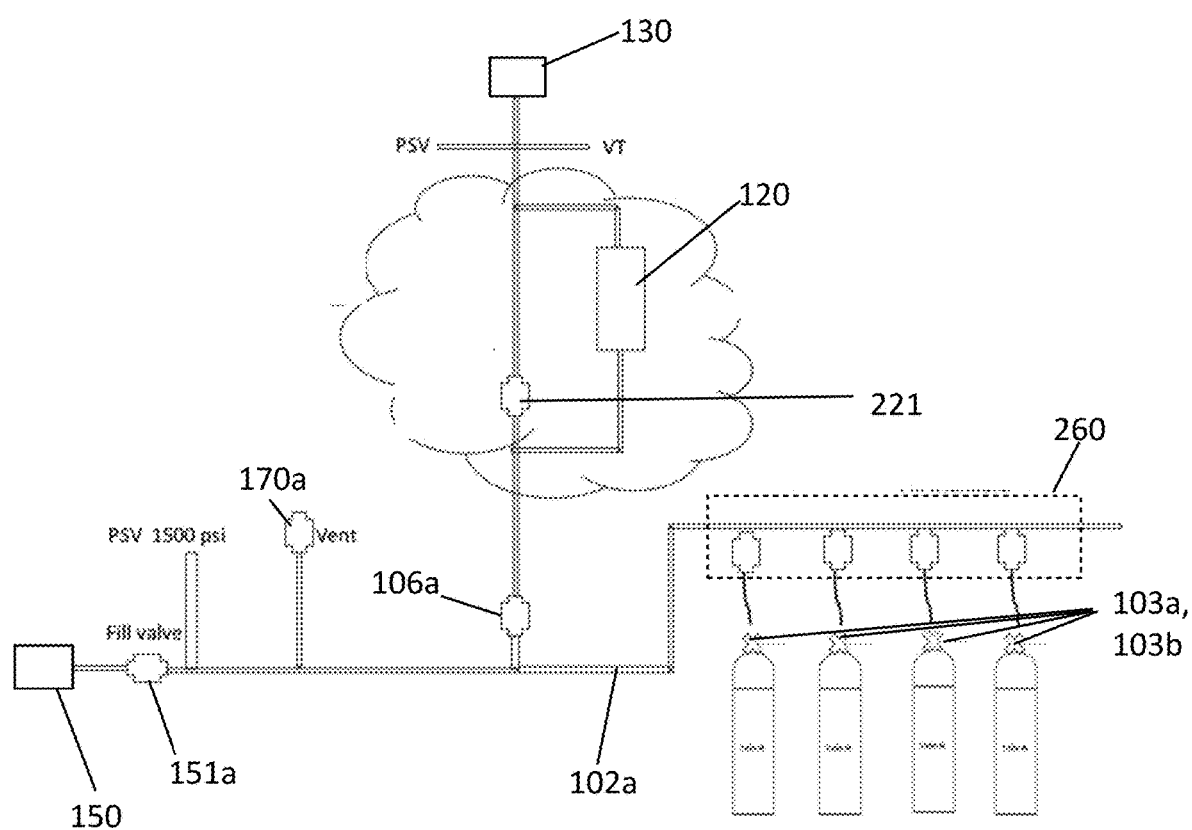
FIG. 2 shows an alternate embodiment of the system.
Figure 3:
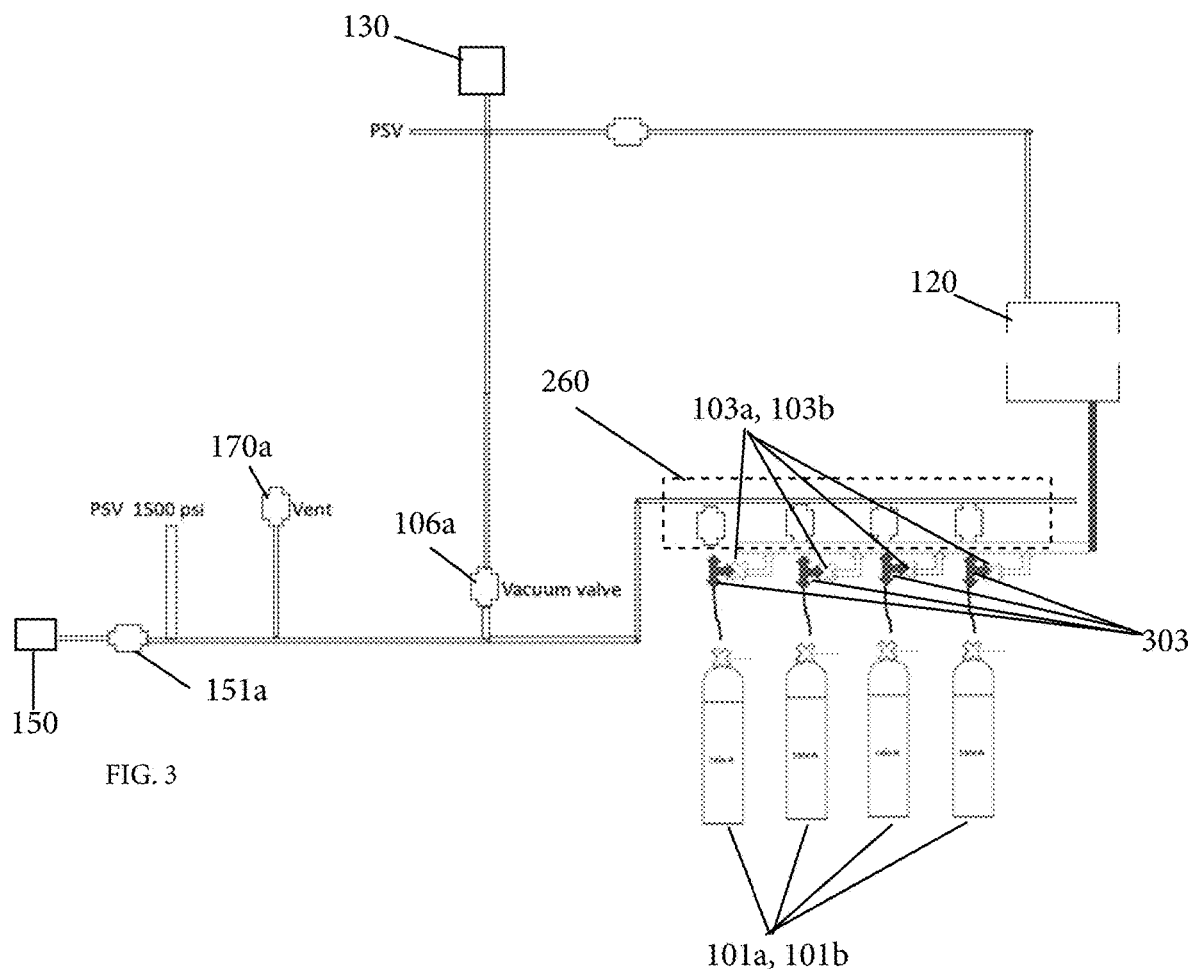
FIG. 3 shows an alternate embodiment of the system.

As can be appreciated from the two gas cylinders 101a, 101b in FIG. 1, but also the multiple cylinders shown in FIGS. 2 and 3, that multiple cylinders 101a, 101b may be used with the system, each with its own gas cylinder engagement valves 103a, 103b. This speeds the process of testing and filling cylinders.

In order to avoid running individual lines to each gas cylinder, a fill manifold 260 may be used to split the gas vent/fill line 102 for fluid communication between the gas source 150 and vacuum pump 130 and dewpoint monitor 120. In the alternate embodiment shown in FIG. 3, pigtail shutoff valves 303 in fluid communication with, and between, the multiple gas cylinder engagement valves 103a, 103b and the compressed gas cylinders 101a, 101b may be open closed to allow for one or more of the multiple compressed gas cylinders 101a, 101b to be selectively filled with compressed gas from a compressed gas source 150. In such a way, testing one compressed gas cylinder could done simultaneous with filling another of the compressed gas cylinders.

As shown in FIG. 2, the system 100 may include a dewpoint diverter valve 221 in fluid communication with the vacuum pump 130 and vacuum valve, wherein when the dewpoint diverter valve 221 is closed, compressed gas is diverted to the dewpoint monitor 120 for moisture measurement. As is further clear from FIG. 2, but also in FIGS. 1 and 3, multiple compressed gas cylinders can be filled with compressed gas from a compressed gas source 150 at the same time.

Method of Testing and Filling

During a testing phase for a gas cylinder, first the compressed cylinder 101a, 101b may be vented by opening the gas cylinder engagement valves 103a, 103b and vent 170a, 170b, at a time when the source valve 151a, 151b, and vacuum valve 106a, 106b are closed. This removes any compressed gas from within the compressed gas cylinder 101a, 101b.

Next, with the vent valve 170a, 170b closed, the vacuum valve 106a, 106b may be opened and the vacuum pump 130 draws any residual gas with any moisture from the cylinder 101a, 101b into the dewpoint monitor 120 using the vacuum pump 130. As shown in FIG. 2, the dewpoint diverter 221 would have to be activated to allow for air to pass into the dewpoint monitor 120.

The dewpoint monitor 120 then reads the moisture content in the compressed gas, which measurement may be exported to a notification system 140, wherein the notification system 140 may be programed to send an alert to a user if the moisture content exceeds and/or meets a predefined level.

If the compressed gas cylinder 101a, 101b meets or is below the predefined moisture content level, a filling phase is straightforward. First, with all valves that were open during the testing phase, the vent 170a, 170b may be opened with the vacuum pump 130 off. This vents the system. Other vents may be open to achieve this as well. With the vent closed, and only the gas cylinder engagement valve 103a, 103b open, the source valve 151a, 151b may be open until the compressed gas cylinder reaches a desired pressure capacity. Then the gas cylinder engagement valve 103a, 103b may be closed for safe removal of the now-filled gas cylinder 101a, 101b.

The benefits of using a dewpoint monitor 120 is that free moisture that is left in the cylinder can quickly be detected, which was difficult or impossible to do by a visual inspection. The dewpoint monitor 120 is quick to react and recover from a dewpoint shift and allows for a definitive measurement to be made, usually within seconds. Thus, in an automated process, the system and method allow an almost immediate reaction to alert the cylinder filler, whether it be manual or automatic, that the cylinder should not be filled, thereby avoiding unnecessary fill process delays and while ensuring the integrity of the cylinders.

The method and device provide the ability to detect moisture in a cylinder at atmospheric pressure and under vacuum in a short duration time period. It also eliminates the need to invert a cylinder to detect moisture in cylinder at a specified dewpoint. Furthermore, it has the advantage of avoiding lengthy time periods to both finalize end point of moisture measurement and to recover to a specified based moisture level before procedure to next test sequence. The method and device instead do not inhibit the normal cycle time of the fill process for a cylinder, including a carbon dioxide cylinder. The attributes of the instrument allow for fast determination and rapid recovery of a set base line enabling the system to make timely and reliable measurements. This method and system could also be retrofitted to operate on an existing cylinder filling apparatus whether the apparatus be for automatic or manual filling of cylinders.

While the invention has been described with reference to the embodiments above, a person of ordinary skill in the art would understand that various changes or modifications may be made thereto without departing from the scope of the claims.

The invention claimed is:

1. A system to detect moisture level in a compressed gas cylinder comprising:
   a gas vent/fill line configured to be in fluid communication with a compressed gas cylinder;
   a vacuum system comprising a vacuum line and a vacuum pump connected to the vacuum line;
   a dewpoint monitor connected to a dewpoint line and the vacuum line; and
   more than one gas cylinder engagement valve configured to engage the compressed gas cylinder and the gas vent/fill line;
   a dewpoint diverter valve in fluid communication with the vacuum pump and vacuum valve, wherein when the dewpoint diverter valve is closed, compressed gas is diverted to the dewpoint monitor for moisture measurement;
   wherein when a compressed gas cylinder is connected to the gas vent/fill line, the vacuum pump draws gas from the gas vent/fill line into the vacuum line and the dewpoint line, and into the dewpoint monitor, where the dewpoint monitor measures moisture content in compressed gas;
   wherein the gas vent/fill line is in fluid communication with the compressed gas cylinder through a fill manifold comprising the multiple gas cylinder engagement valves.

2. The system to detect moisture level in a compressed gas cylinder of claim 1, comprising a vacuum valve located between and connecting the gas vent/fill line.

3. The system to detect moisture level in a compressed gas cylinder of claim 2, wherein when the vacuum valve is closed, the vacuum pump cannot draw gas from the gas vent/fill line.

4. The system to detect moisture level in a compressed gas cylinder of claim 1, further comprising a control system that controls the vacuum pump.

5. The system to detect moisture level in a compressed gas cylinder of claim 1, further comprising a notification system, wherein dewpoint measurements from the dewpoint monitor are communicated to the notification system, wherein the notification system activates a message in response to a threshold moisture level in the compressed gas cylinder.

6. The system to detect moisture level in a compressed gas cylinder of claim 1, further comprising a control system that controls the vacuum pump that includes a notification system, wherein dewpoint measurements from the dewpoint monitor are communicated to the control system and if a threshold moisture level in the compressed gas cylinder is met or exceeded, the control system directs the notification system to activate a message.

7. The system to detect moisture level in a compressed gas cylinder of claim 1, further comprising a source of compressed gas in fluid communication with the gas vent/fill line.

8. The system to detect moisture level in a compressed gas cylinder of claim 7, further comprising a source valve between the source of compressed gas and the gas vent/fill line.

9. A system to detect moisture level in a compressed gas cylinder comprising:
- a gas vent/fill line configured to be in fluid communication with a compressed gas cylinder:
- a vacuum system comprising a vacuum line and a vacuum pump connected to the vacuum line;
- a dewpoint monitor connected to a dewpoint line and the vacuum line; and
- more than one gas cylinder engagement valve configured to engage the compressed gas cylinder and the gas vent/fill line;
- a dewpoint diverter valve in fluid communication with the vacuum pump and vacuum valve, wherein when the dewpoint diverter valve is closed, compressed gas is diverted to the dewpoint monitor for moisture measurement; and
- pigtail shutoff valves in fluid communication with, and between, the multiple gas cylinder engagement valves and the compressed gas cylinders wherein opening or closing the pigtail shutoff valves allows for one or more of the multiple compressed gas cylinders to be selectively filled with compressed gas from a compressed gas source;
- wherein when a compressed gas cylinder is connected to the gas vent/fill line, the vacuum pump draws gas from the gas vent/fill line into the vacuum line and the dewpoint line, and into the dewpoint monitor, where the dewpoint monitor measures moisture content in compressed gas.

10. A system to detect moisture level in a compressed gas cylinder comprising:
- a gas vent/fill line configured to be in fluid communication with a compressed gas cylinder;
- a vacuum system comprising a vacuum line and a vacuum pump connected to the vacuum line;
- a dewpoint monitor connected to a dewpoint line and the vacuum line;
- more than one gas cylinder engagement valve configured to engage the compressed gas cylinder and the gas vent/fill line;
- more than one gas vent/fill line and vacuum line, wherein multiple compresses gas cylinders can be filled with compressed gas from a compressed gas source at the same time; and
- a dewpoint diverter valve in fluid communication with the vacuum pump and vacuum valve, wherein when the dewpoint diverter valve is closed, compressed gas is diverted to the dewpoint monitor for moisture measurement;
- wherein when a compressed gas cylinder is connected to the gas vent/fill line, the vacuum pump draws gas from the gas vent/fill line into the vacuum line and the dewpoint line, and into the dewpoint monitor, where the dewpoint monitor measures moisture content in compressed gas;
- wherein multiple compressed gas cylinders can be filled with compressed gas from a compressed gas source at the same time.

\* \* \* \* \*